United States Patent
McLain

(10) Patent No.: US 7,751,337 B2
(45) Date of Patent: Jul. 6, 2010

(54) METHOD AND APPARATUS FOR OPTIMIZING FORWARD LINK DATA RATE FOR RADIO FREQUENCY TRANSMISSIONS TO MOBILE PLATFORMS

(75) Inventor: Christopher J. McLain, Seattle, WA (US)

(73) Assignee: The Boeing Company, Chicago, IL (US)

(*) Notice: Subject to any disclaimer, the term of this patent is extended or adjusted under 35 U.S.C. 154(b) by 2278 days.

(21) Appl. No.: 10/361,398

(22) Filed: Feb. 10, 2003

(65) Prior Publication Data

US 2004/0158863 A1 Aug. 12, 2004

(51) Int. Cl.
*H04J 3/16* (2006.01)
(52) U.S. Cl. .......................... 370/252; 370/332; 455/69
(58) Field of Classification Search ................. 370/252, 370/253, 328, 332, 333, 313; 455/430, 456.1, 455/69, 11.1, 12.1, 13.1, 427
See application file for complete search history.

(56) References Cited

U.S. PATENT DOCUMENTS

| | | | |
|---|---|---|---|
| 3,972,045 A | 7/1976 | Perret | |
| 4,392,139 A | 7/1983 | Aoyama et al. | |
| 4,743,906 A | 5/1988 | Fullerton | |
| 4,866,515 A | 9/1989 | Tagawa et al. | |
| 4,901,307 A | 2/1990 | Gilhousen et al. | |
| 4,958,381 A | 9/1990 | Toyoshima | |
| 5,127,021 A | 6/1992 | Schreiber | |
| 5,146,234 A | 9/1992 | Lalezari | |
| 5,230,076 A | 7/1993 | Wilkinson | |
| 5,249,303 A | 9/1993 | Goeken | |
| 5,285,470 A | 2/1994 | Schreiber | |
| 5,289,272 A | 2/1994 | Rabowsky et al. | |
| 5,311,302 A | 5/1994 | Berry et al. | |
| 5,313,457 A | 5/1994 | Hostetter et al. | |
| 5,463,656 A | 10/1995 | Polivka | |
| 5,495,258 A | 2/1996 | Muhlhauser et al. | |
| 5,524,272 A | 6/1996 | Podowski et al. | |

(Continued)

FOREIGN PATENT DOCUMENTS

EP 0577054 B1 3/1998

(Continued)

*Primary Examiner*—Chi H. Pham
*Assistant Examiner*—Kevin Mew
(74) *Attorney, Agent, or Firm*—Harness, Dickey & Pierce, P.L.C.

(57) ABSTRACT

A system and method for monitoring and adjusting the data transmission rate of a forward link RF signal from a base station to a mobile platform to maintain a desired, minimum link margin with each of the mobile platforms. The system involves using a signal quality monitoring subsystem carried by each mobile platform during the normal course of its operation to transmit signal quality information via a return link to the base station. The base station uses the signal quality information to monitor and adjust the signal quality of subsequent forward link signals transmitted to the mobile platforms in a manner that optimizes the data transmission rate of the forward link signals. The present invention better accounts for time varying factors that influence the signal quality of received forward link signals by the mobile platforms and obviates the need for mobile test platforms or other expensive and relatively complex methods for predicting needed data transmission rates for the forward link signals.

14 Claims, 2 Drawing Sheets

U.S. PATENT DOCUMENTS

| | | |
|---|---|---|
| 5,555,466 A | 9/1996 | Scribner et al. |
| 5,568,484 A | 10/1996 | Margis |
| 5,583,735 A | 12/1996 | Pease et al. |
| 5,760,819 A | 6/1998 | Sklar et al. |
| 5,790,175 A | 8/1998 | Sklar et al. |
| 5,801,751 A | 9/1998 | Sklar et al. |
| 6,018,659 A | 1/2000 | Ayyagari et al. |
| 6,034,634 A | 3/2000 | Karrisson et al. |
| 6,047,165 A | 4/2000 | Wright et al. |
| 6,104,914 A | 8/2000 | Wright et al. |
| 6,108,523 A | 8/2000 | Wright et al. |
| 6,249,913 B1 | 6/2001 | Galipeau et al. |
| 6,477,152 B1 | 11/2002 | Hiett |
| 6,741,841 B1 | 5/2004 | Mitchell |
| 6,757,712 B1 | 6/2004 | Bastian et al. |
| 6,781,513 B1* | 8/2004 | Korkosz et al. .......... 340/539.1 |
| 6,847,801 B2* | 1/2005 | de La Chapelle et al. .. 455/12.1 |
| 6,965,658 B1* | 11/2005 | Lindqvist et al. ............ 375/347 |
| 7,218,931 B2* | 5/2007 | Karabinis ................... 455/427 |
| 7,289,771 B2* | 10/2007 | Davis .......................... 455/69 |
| 7,321,383 B2* | 1/2008 | Monagahn et al. ........ 348/14.02 |
| 7,324,782 B1* | 1/2008 | Rudrapatna ................... 455/25 |
| 7,519,019 B2* | 4/2009 | Yoon et al. ................... 370/328 |
| 2002/0087992 A1 | 7/2002 | Bengeult et al. |
| 2002/0110088 A1* | 8/2002 | Lundby et al. .............. 370/252 |
| 2002/0160773 A1 | 10/2002 | Gresham et al. |
| 2003/0128671 A1* | 7/2003 | Niesen ....................... 370/313 |
| 2004/0219879 A1* | 11/2004 | Stephenson ................ 455/12.1 |
| 2004/0228283 A1* | 11/2004 | Naguib et al. .............. 370/252 |
| 2004/0233867 A1* | 11/2004 | Wheatley et al. ............ 370/328 |
| 2005/0111407 A1* | 5/2005 | Hosein et al. ............... 370/329 |
| 2006/0203731 A1* | 9/2006 | Tiedemann et al. ......... 370/235 |
| 2007/0025269 A1* | 2/2007 | Padovani et al. ............ 370/252 |

FOREIGN PATENT DOCUMENTS

| | | |
|---|---|---|
| EP | 1096699 | 5/2001 |
| EP | 1209928 | 5/2002 |
| WO | WO94/24773 | 10/1994 |
| WO | WO00/14987 | 3/2000 |
| WO | WO01/97433 | 12/2001 |

* cited by examiner

METHOD AND APPARATUS FOR OPTIMIZING FORWARD LINK DATA RATE FOR RADIO FREQUENCY TRANSMISSIONS TO MOBILE PLATFORMS

FIELD

The present invention relates to radio frequency (RF) communication systems, and more particularly to an RF communication system and method in which signal quality information relating to the signal quality of received RF signals by a mobile platform is transmitted back to a base station, which in turn modifies a data transmission rate of forward link RF signals transmitted to the mobile platform to maintain a desired signal quality level of the RF signals received by the mobile platform.

BACKGROUND

With a mobile/satellite communications network, such as the Connexion By Boeing™ system, disclosed in U.S. patent application Ser. No. 09/989,742, the disclosure which is hereby incorporated by reference, high speed data from a wide area network (such as the Internet) and various entertainment content is supplied to users and operators of commercial and business aircraft. However, such mobile/satellite networks are not limited to only aircraft, and may just as readily include land vehicles, such as trucks and trains, or mobile platforms such as ships and yachts.

The Connexion By Boeing™ system mentioned above is comprised of generally four segments: a space segment which consists of a leased, fixed satellite service (FSS) transponders, an aircraft earth station segment (i.e., a mobile platform segment) which consists of RF transceiver terminals installed on each aircraft that operates within a given coverage region, a ground-based earth station segment which consists of one or more Fixed Satellite Services (FSS) earth stations, and a network operation center (NOC) which controls the aggregate emissions from the RF transceivers on each of the mobile platforms in order to prevent interference to other satellite-based transponders orbiting in the vicinity of the FSS transponder which is linking the FSS earth station with the mobile platforms. This communications system is shown in FIG. 1. The ground station is in communication with the NOC, preferably via redundant high speed data connections. Multiple ground stations may be included and operate on "stand-by" for redundancy purposes.

With reference to FIG. 2, the communication link with the mobile platform consists of two parts: one or more forward RF links and a return RF link. Each forward RF link carries data from the ground station via the satellite based FSS transponder to the transceivers located on each of the mobile platforms at a high data rate (up to five Mbps or greater). A forward link consists of a single carrier per forward link transponder. Multiple mobile platforms receive the forward link signal, demodulate the package stream of information that it carries, and sort out the packets that are addressed to that particular mobile platform. Each mobile platform may receive signals from multiple forward link transponders. The return link signal from each mobile platform carries data from that particular mobile platform via the satellite based FSS transponder to the ground station. In one preferred form, separate transponders are used for the forward link and return link signals. Each mobile platform transmits data via its return link signal at varying rates, but typically between 16K bps and 1024K bps. Typically, a satellite based FSS transponder is shared by multiple mobile terminals using one or more well known frequency spreading techniques.

In general, it is a goal of a mobile/satellite communication system as described above to maximize the data rate of forward link transmissions to the mobile platforms while maintaining a sufficient "link margin" at all points in a desired coverage area to close the communications link. Link margin is the difference between the measured Eb/No (energy per bit divided by noise power spectral density) received at the ground station and the threshold value of Eb/No at which the communications link is dropped. Transmitting forward link signals at the highest data rates possible while maintaining a sufficient link margin to close the communications link with the mobile platform makes the best (i.e., most cost efficient) use of expensive satellite-based FSS transponders. However, it will be appreciated that increasing the data rate decreases the Eb/No, and therefore the link margin, at any point within a given coverage region. Thus, the link margin of the forward link signals to the mobile platforms operating within a given coverage region will fall as the data transmission rate is increased. This is because the FSS satellite has a fixed transmit power, so increasing the data rate decreases the energy per bit (Eb) and, therefore, Eb/No and link margin. Eventually, an unacceptably high level of bit errors will occur for the signal received by the mobile platforms when the Eb/No falls below a threshold value. At this point, the link will be considered as having dropped (i.e. failed).

When selecting an appropriate forward link data transmission rate, the system designer must contend with a number of factors that cause Eb/No, and therefore link margin, to vary with the location of the mobile platform. The Eb component of Eb/No received at the mobile platform transceiver is influenced by the satellite equivalent isotropic radiated power (EIRP), which may vary by several dB over the coverage area of the satellite. The Eb component is also influenced by the gain of the antenna used on the mobile platform. When a phased array antenna is used on the mobile platform, then it will be appreciated that the gain of such an antenna will decrease with increasing scan angle. A mobile platform that is operating farther from a given satellite/based ESS transponder will have a higher scan angle from zenith to the satellite and therefore a lower antenna gain and, thus, a lower received Eb and link margin. The noise power spectral density (No) component of Eb/No is influenced by the interference noise the mobile platform receives from satellite transponders associated with satellites operating in proximity to the FSS transponder(s) that the mobile platform is attempting to communicate with. This interference varies with location because adjacent satellites also have EIRP patterns that vary with location. Increased interference increases No, which in turn decreases Eb/No and link margin. In addition, atmospheric and rain attenuation, which vary with local climate, both affect the Eb and No of transmitted RE signals.

Furthermore, the system designer must also consider the time varying nature and imprecise knowledge of factors that influence Eb/No and link margin. Thus, it will be appreciated that operators must contend with a wide variety of factors, some of which vary with time, that influence the Eb/No of transmitted RF signals.

Traditionally, approaches that have been used for selecting the appropriate forward length data transmission rate include performing a link budget analysis, performing test measurements at a limited number of points within a geographic region, and test measurements using a mobile test platform. The link budget analysis method is relatively straight forward, but also relatively inaccurate. With this method, link margins are calculated and optimized using published EIRP maps for both the serving (i.e., target) FSS satellite and adjacent satellites, making assumptions about the signals operating on adjacent satellites. The tendency of the analysis is to make conservative assumptions when accurate data is unavailable in order to prevent unintended link dropouts within the desired coverage area. This method does not have a means for compensating for time varying parameters, such as variation in adjacent satellite interference. In some cases, testing by the assignee has revealed that link margins can be several dB higher than those predicted by conservative link budget analysis. This excess link margin represents wasted margin, as it could be converted to increased data rate of the forward link signals.

The second method mentioned above involves taking a test measurement at one or more points within a geographic region. With this method, link margins are calculated at specific locations using test equipment that is representative of the equipment used on actual mobile platforms. These test measurements can be used to calibrate analytical link budget models. By making measurements periodically, it is possible to adjust for time varying factors that can affect the link margin. However, the calibrations are only valid for the point at which they are taken. Point measurements may not capture variations with location. For example, some EIRP patterns from adjacent satellites may overlap a portion of the desired coverage area. If the measurement location is taken outside of the EIRP pattern for a given interfering satellite, the measurement will not register changes in the interference from that particular satellite. In addition, maintaining test rigs at multiple points within a coverage area, and possibly in multiple coverage regions around the world, is extremely expensive.

Finally, the third method mentioned above, that of taking test measurements using a mobile test platform, can resolve many of the technical difficulties of taking measurements at specific points within a geographic region, but is nevertheless a much more expensive method to implement. In this method, a mobile test platform is used to take measurements along selected routes across a desired coverage area. This provides far more points to calibrate an analytical model with, so that it avoids the problems that face the point measurement method described above. However, maintaining and using a mobile platform strictly for testing is also an extremely expensive method for obtaining the information needed for an accurate analytical model. Also, because individual test flights are expensive to perform, it would be difficult, if not cost prohibitive, to use a dedicated test aircraft across designated flight routes with sufficient frequency to capture various time varying effects that could influence the EIRP patterns for such flight routes.

Accordingly, there still exists a need for a system and method for monitoring and adjusting the data transmission rate of a forward link signal received by one or more mobile platforms in a manner which maintains closure of a communication link with each of the mobile platforms, but which still does not result in excessive link margin, and therefore, optimizes the performance of the communication links formed with each of the mobile platforms. There is further a need for such a system and method that can perform adjustments to the data transmission rate of forward link signals on a near real time basis to counter time varying factors that influence the Eb/No and link margin of forward link signals received by the mobile platforms.

SUMMARY

The present disclosure is directed to a system and method for monitoring and adjusting the data transmission rate of signals transmitted from a base station to one or more mobile platforms in a manner that enables the base station to receive signal quality information relating to the signal quality of received forward link signals by the mobile platforms, and enables the base station to adjust the data transmission rate of subsequent forward link signals as needed to maintain a desired signal quality level for the forward link signals received by the mobile platforms.

In one preferred form, each of the mobile platforms includes a radio frequency (RF) transceiver and a subsystem for determining a signal quality of received forward link signals from the base station that are received via a satellite-based transponder. The signal quality monitoring subsystem generates signal quality information that is transmitted via return link signals from the mobile platforms, via the satellite-based transponder, to the base station. The base station uses the signal quality information to determine if the data transmission rate of subsequent forward link signals needs to be increased or decreased to optimize the communication links with each of the mobile platforms. More specifically, the base station determines whether the data transmission rate needs to be increased or decreased to maintain a predetermined link margin for the mobile platforms.

In one preferred form, the signal quality monitoring subsystem of each mobile platform measures Eb/No (i.e., ratio of energy-per-bit to noise spectral density) values which are transmitted to the base station and analyzed. In another preferred implementation each mobile platform measures C/N (i.e., ratio of carrier power to noise power) values which are transmitted to the base station and analyzed.

In preferred implementations, the base station further considers whether a predetermined quantity of signal quality information from the mobile platforms has been received before making any adjustment to the data transmission rate of subsequent forward link signals. In still another alternative implementation, the base station considers whether signal quality information from a predetermined number of predefined geographic locations has been received before making any adjustment to the data transmission rate of subsequent forward link signals. In still another implementation, the base station considers whether the signal quality information received from the mobile platforms has changed by a sufficient degree from a predetermined threshold before making any adjustments to the data transmission rate of forward link signals transmitted to the mobile platforms.

With each of the implementations and systems described above, the base station uses the signal quality information provided by the mobile platforms during normal operation of the mobile platforms to determine if the data transmission rate of subsequent forward link signals should be increased or decreased to optimize the communication links with the mobile platforms. Advantageously, corrections to the data transmission rate can be made in near real time to accommodate time varying factors that influence the signal quality of forward link signals received by the mobile platforms.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description of the embodiment(s) is merely exemplary in nature and is in no way intended to limit the disclosure, its application, or uses.

Figure 1:
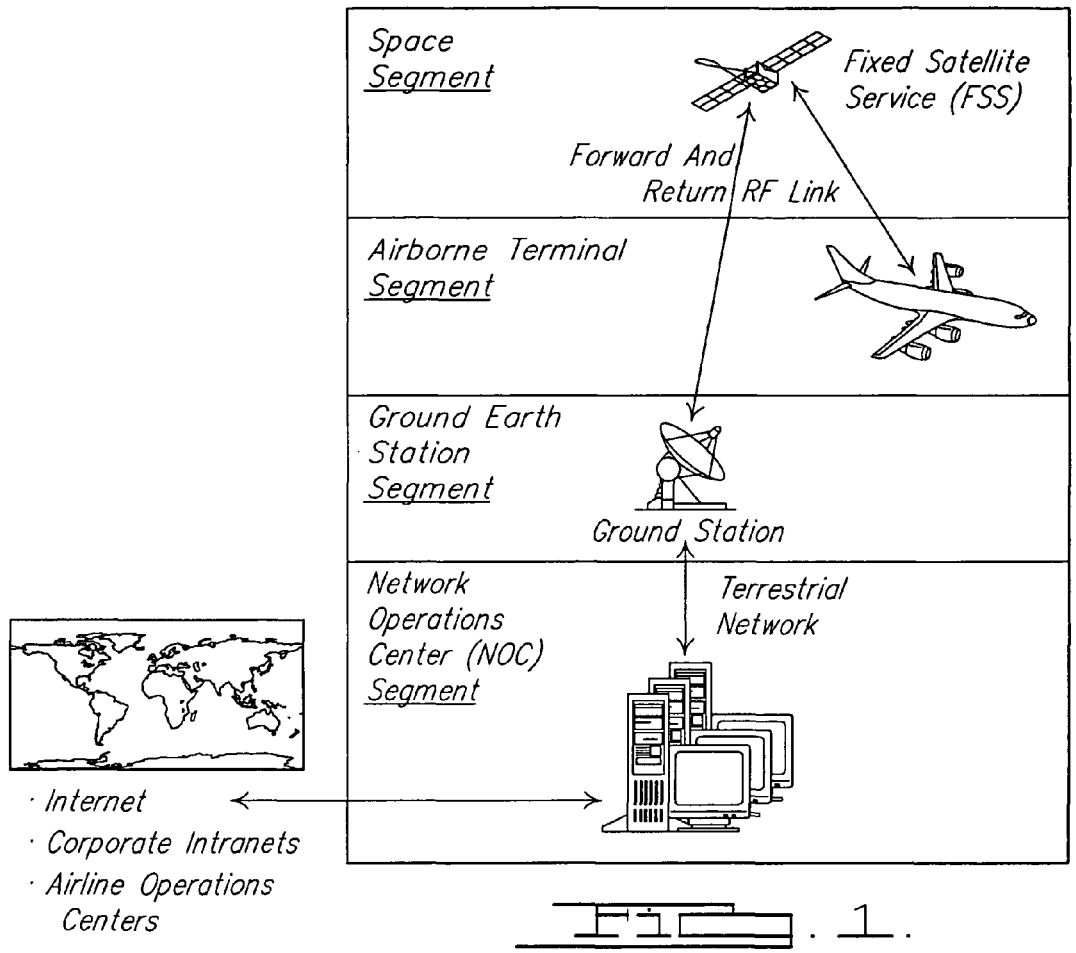
FIG. 1 is a view of the basic components of a communication system in accordance with the present disclosure.
Figure 2:
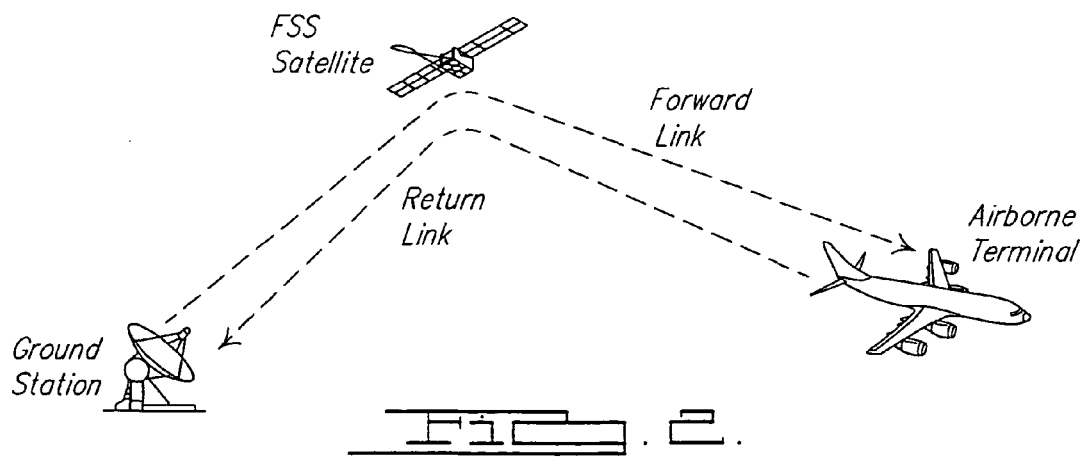
FIG. 2 is a simplified figure illustrating the forward link and return link signals between a base station and a mobile platform.
Figure 3:
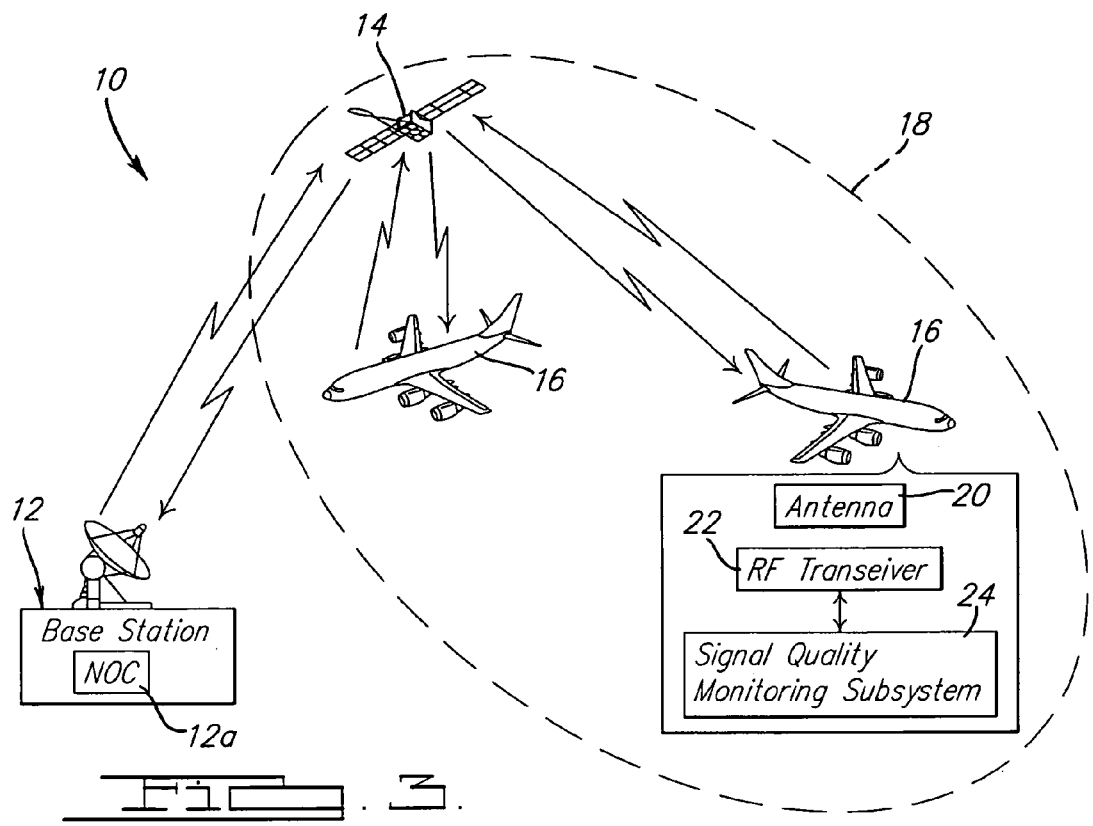
FIG. 3 is a simplified diagram illustrating a system in accordance with an embodiment of the present disclosure.

Referring to FIG. 3, there is shown a communication system 10 in accordance with an embodiment of the present disclosure. The system generally includes a base station 12 for transmitting forward link RF signals to a space-based FSS transponder 14, which in one preferred form is a satellite-based FSS transponder. The forward link signals are relayed by the space-based transponder 14 to at least one mobile platform 16 operating within a given predetermined coverage region 18. However, it will be appreciated that in actual practice, a plurality of mobile platforms 16 will typically be operating within the coverage region 18, and will each be receiving the forward link signals. The mobile platforms are illustrated as aircraft in FIG. 3, but it will be appreciated that the system 10 is not limited to use with only aircraft, but could just as readily be implemented with mobile land based vehicles such as trucks, busses and trains, or even sea going vehicles such as ships, yachts, submarines, etc. Accordingly, the system 10 contemplates the use of virtually any form of mobile platform which operates within a given coverage region.

With further reference to FIG. 3, each mobile platform 16 includes at least one RE antenna 20, a RE transceiver 22 and a signal quality monitoring subsystem 24. Although separate receive and transmit antennas may be preferred, for simplicity only a signal antenna will be referred to throughout the following description. The antenna 20 on each mobile platform 16 receives the forward link RE signals from the base station 12 as relayed by the space-based transponder 14. The RE transceiver 22 of each mobile platform 16 receives a data packet stream which is contained in the forward link RE signals and filters off those packets not intended for it. The remaining data packets are demodulated and decoded. The signal quality monitoring subsystem 24 operates in connection with the RE transceiver 22 to provide a signal quality value of the quality of the information received via the forward link signals from the base station 12. The signal quality monitoring subsystem 24 preferably comprises a field programmable gate array that also handles demodulating of the data packet information. However, it will be appreciated that the signal quality monitoring function could also be implemented in any suitable electronic component. The signal quality information generated by the subsystem 24 may take the form of Eb/No (ratio of energy-per-bit to noise spectral density) information, C/N (i.e., ratio of carrier power to noise power), or any other measurement which provides an indication of the signal quality of the received forward link signals.

The RE transceiver 22 is then used to transmit return link signals via the antenna 20 to the space-based transponder 14, which are then relayed back to the base station 12. These return link signals include the signal quality information described above. The base station 12 includes a network operation center (NOC) 12a which analyzes the signal quality information and adjusts the data transmission rate of subsequent RE signals, if needed, to maintain a desired signal quality level. Put differently, the NOC 12a adjusts the data transmission rate of subsequent forward link signals as needed to maintain a desired communication link margin. The desired communication link margin is such as to enable the communication link to be closed with each of the mobile platforms 16 operating with the coverage region 18 while maintaining a predetermined link margin necessary to ensure that no drop outs in the communication link will occur with the mobile platforms 16 as they travel within different subregions of the coverage region 18.

Figure 4:
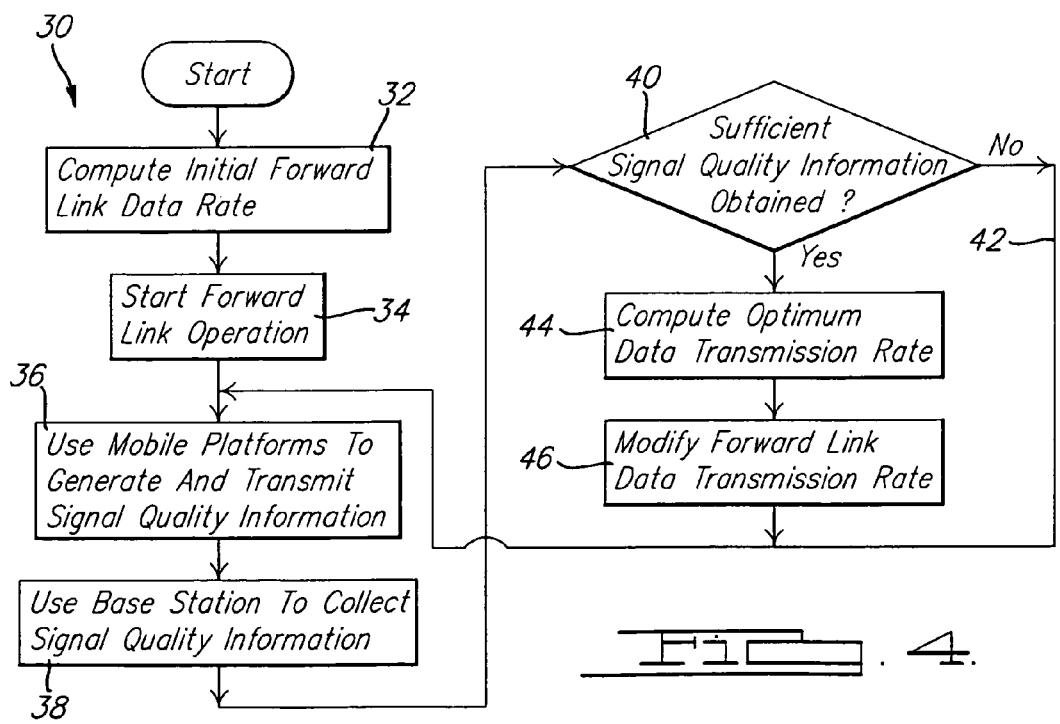
FIG. 4 is a flow chart of the steps performed by a method of the present disclosure.

Referring now to FIG. 4, a flow chart 30 is illustrated setting forth operations of the method of the present disclosure. Initially, the NOC 12a computes an initial forward link data rate to be used with an initial forward link transmission, as indicated at step 32. The base station 12 then begins transmitting forward link signals, as indicated at operation 34. The mobile platforms 16 then generate and transmit the signal quality information back via their respective return links to the base station 12, as indicated at operation 36.

The information provided at step 36 could also comprise additional information regarding the time, heading, attitude, etc. or other variables relating to the operation of the mobile platform 16. Signal quality measurements may be made at fixed intervals by each mobile platform 16, or on command by the NOC 12a of the base station 12 by commands given over the forward link signals.

The base station 12 then collects the signal quality information, as indicated at operation 38. The base station 12 then makes a determination if sufficient signal quality information has been obtained, as indicated at operation 40. If not, loop 42 indicates that the base station 12 continues to collect signal quality information until the inquiry at operation 40 produces a positive answer, as indicated by loop 42. When this occurs, the base station 12 then computes the optimum data transmission rate for subsequent forward link signals, as indicated at operation 44. Finally, the base station 12 modifies the forward link data transmission rate as needed to optimize the communications link, as indicated at operation 46.

With further reference to FIG. 4, the determination made at operation 44 may involve analyzing Eb/No information transmitted by the mobile platforms 16 in determining when the Eb/No information transmitted from any one of the mobile platforms 16 drops below a predetermined threshold level. Alternatively, operation 44 may involve analyzing C/N information transmitted by the mobile platform 16 and determining when this ratio drops below a predetermined threshold level. It will be appreciated that any other suitable measure of signal quality could readily be implemented with the method of the present disclosure. Still further, the action of operation 40 may involve determining if signal quality information from a predetermined range of geographic sublocations within the coverage region 18 has been obtained, or that a predetermined data acquisition time has passed (e.g., twenty four hours) before the base station 12 makes a determination as to the optimum data transmission rate of the forward link signals in operation 44. Waiting until signal quality information has been collected from a predetermined range of geographic sublocations will ensure that adequate link margin is maintained over the entire geographic extent of the coverage region. Waiting a predetermined fixed time interval is particularly easy to implement and convenient for changing data rates during times when few users are accessing the system 10.

Optimizing the data transmission rate at operation 44, in one preferred form, can be made by taking the lowest signal quality measurement (e.g., the lowest Eb/No) measurement and then increasing or decreasing the link data rate proportional to the difference between the lowest signal quality measurement and the desired link margin. For example, if the lowest Eb/No measurement obtained is 3.5 dB and the desired link margin is 4.0 dB, then the NOC 12a would decrease the forward link data rate by 0.5 dB or approximately 10%. However, one disadvantage of this approach is that for any large data set there is likely to be some measurements (i.e., "outliers") that are not representative of the overall group of measurements taken. For example, the signal quality measurement of an individual mobile platform may be uniquely affected by a circumstance such as local blockage, severe local weather or equipment malfunction. An alternative method involves using the signal quality measure of a predetermined percentile (e.g., 1%) to eliminate any outliers. For example, the optimization may be performed with the Eb/No value that is lower than 99% (i.e. the one percentile value) of measured Eb/No values in the data set. This would exclude the lowest 1% of measurements that could have been compromised by a unique circumstance. In a further alternative method, the importance of specific measurements could also be weighted by where each measurement occurred relative to traffic concentrations within the geographic region.

A principal advantage of the present disclosure is that the mobile platforms 16 are used during the normal course of their commercial operation to provide the needed signal quality information to the base station 12. This provides much more accurate information to the base station 12 for the purpose of determining the needed data transmission rate to achieve and maintain the desired link margin. Using the mobile platforms 16 during the course of their normal commercial operation further eliminates the need for dedicated test platforms, or performing dedicated test flights through various areas of a coverage region, while still providing even more accurate signal quality information to the base station 12 for the purpose of adjusting the data transmission rate of the forward link signals.

It will also be appreciated that in a commercial implementation of the present disclosure, the signal quality data could be provided with a low priority so that it is only transmitted when the overall demand for return link bandwidth from the mobile platform 16 is low.

It will also be appreciated that in a commercial implementation, up to several hundred aircraft may be accessing a forward link and collecting signal quality measurements. Over the course of a day, many mobile platforms 16 may enter or leave the coverage region and traverse the coverage region while collecting signal quality data. Even mobile platforms 16 sitting on the ground at an airport between flights may collect signal quality measurements for relay to the ground station. Accordingly, in a single day, a greater number of signal quality measurement information could be collected than would ever be feasible using a mobile test platform, and also at very little cost. Furthermore, the signal quality measurement information would have great geographic diversity reflecting the different routes traversed by each aircraft. Thus, the signal quality measurement information used to optimize the forward link would be truly representative of the conditions over the entire coverage area.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A method for monitoring a signal quality of a forward link radio frequency (RF) signal transmitted from a first communications station to a second communications station to maintain a signal quality of said forward link RF signal at a predetermined level, said method comprising:
   transmitting said forward link RF signal from said first communications station to said second communications station;
   using said second communications station to receive said forward link RF signal and to generate a signal quality value representative of a signal quality of said received forward link RF signal;
   using said second communications station to transmit said signal quality value back to said first communications station in a return link RF signal;
   using said first communications station to adjust a data transmission rate for said forward link RF signal to maintain said signal quality at a predetermined level; and
   only adjusting said data transmission rate after a predetermined plurality of return link RF signals from said second communications station, representing said signal quality value, has been received.

2. The method of claim 1, wherein using said second communications station to generate a signal quality value comprises generating a signal representative of a ratio of energy-per-bit to noise spectral density (Eb/No) of said received forward link RF signal.

3. The method of claim 1, wherein the step of using said second communications station to transmit signal quality value information further comprises transmitting location information indicative of a geographic location of said second communications station.

4. The method of claim 1, wherein using said second communications station to generate a signal quality value comprises generating a signal representative of a ratio of carrier power to noise power (C/N) of said received forward link RF signal.

5. The method of claim 1, wherein the step of using said first communications station to adjust said data transmission rate comprises:
   using said second communications station to generate location information and to supply said location information in said return link RF signal, said location information being representative of a geographic location of said second communications station at a given time; and
   only adjusting said data transmission rate after receiving return link RF signals originating from a predetermined range of geographic locations, as reported by said second communications station.

6. A method for managing the transmission of information from a base station, via a radio frequency (RF) link, to a space based RF transponder and then to a RF receiver on-board a mobile platform operating within a predetermined geographic coverage region, wherein the mobile platform includes a signal quality monitoring subsystem, said method comprising:
   transmitting said information to said mobile platform via a forward link signal that is relayed by said space based RF transponder to said mobile platform;

using said signal quality monitoring subsystem to determine a signal quality of said forward link signal;

using said RF transceiver of said mobile platform to transmit a return link signal, via said RF space based transponder, back to said base station, which includes information relating to a signal quality of said forward link signal received by said RF transceiver of said mobile platform;

using said base station to adjust a data rate of said forward link signal to achieve a desired level of signal quality of subsequent transmissions of said forward link signal; and wherein using said base station to adjust a data rate of said forward link signal includes:
collecting signal quality information via return link signals from said mobile platform; and
adjusting said data transmission rate only after said base station determines that said signal quality of said forward link signal has changed by a predetermined value.

7. The method of claim 6, wherein the step of using said signal quality monitoring system comprises:
determining an Eb/No (energy per bit divided by spectral noise density) value of said forward link signal received by said RF transceiver of said mobile platform.

8. The method of claim 6, wherein the step of using said signal quality monitoring system comprises:
determining a carrier-power-to-noise-power ratio value of said forward link signal received by said RF transceiver of said mobile platform.

9. The method of claim 6, wherein the step of using said base station to adjust a data rate of said forward link signal comprises:
collecting signal quality information transmitted via a plurality of said return link signals over a predetermined period of time; and
using said collected signal quality information to adjust said data transmission rate for subsequent forward link signals transmitted from said base station.

10. The method of claim 6, wherein the step of using said base station to adjust a data rate of said forward link signal comprises:
collecting a predetermined quantity of signal quality information from said return link signals; and
using said predetermined quantity of signal quality information to adjust said data transmission rate for subsequent forward link signals transmitted from said base station.

11. The method of claim 6, wherein the step of using said base station to adjust a data rate of said forward link signal comprises:
collecting signal quality information from a plurality of mobile platforms operating over a predetermined range of geographic sub-regions of said predetermined geographic coverage region; and
using said collected signal quality information from said plurality of mobile platforms to adjust said data transmission rate for subsequent forward link signals transmitted from said base station.

12. The method of claim 6, wherein said mobile platform is commanded by said base station, via said forward link signal, when to make a signal quality determination.

13. A communications system for monitoring a quality of a forward link radio frequency (RF) signal transmitted to a mobile platform operating within a predefined geographic coverage region, the system comprising:
a RF transceiver carried on said mobile platform;
a signal quality monitoring subsystem operably associated with said RF transceiver that operates to generate signal quality information relating to a signal quality of received forward link RE signals from said base station; and
a base station for transmitting forward link RF signals to said mobile platform, monitoring return link RF signals transmitted from said RF transceiver of said mobile platform back to said base station, and for determining if said subsequently transmitted forward link RF signals need to be modified to maintain a desired signal quality level; and
the base station adapted to only adjust said data transmission rate after a predetermined plurality of return link RF signals from said second communications station, representative of said signal quality value, has been received.

14. The system of claim 13, wherein said base station is adapted to modify a data transmission rate of said forward link RF signal.

* * * * *